United States Patent [19]

Kervagoret

[11] Patent Number: 4,470,432
[45] Date of Patent: Sep. 11, 1984

[54] DISTRIBUTOR FOR A HYDRAULIC SERVO MECHANISM

[75] Inventor: Gilbert Kervagoret, Argenteuil, France

[73] Assignee: Societe Anonyme D.B.A., Paris, France

[21] Appl. No.: 457,347

[22] Filed: Jan. 12, 1983

[30] Foreign Application Priority Data

Jan. 18, 1982 [FR] France .................. 82 00666

[51] Int. Cl.[3] .............................................. B62D 5/08
[52] U.S. Cl. ............................ 137/625.22; 91/375 R; 91/375 A
[58] Field of Search .................. 137/625.21, 625.22, 137/625.23, 625.24; 91/375 A, 375 R

[56] References Cited

FOREIGN PATENT DOCUMENTS 41887 5/1981 European Pat. Off. .
53559 6/1982 European Pat. Off. .
2160548 6/1973 France .

Primary Examiner—Alan Cohan
Attorney, Agent, or Firm—Paul D. Schoenle; Ken C. Decker

[57] ABSTRACT

The rotary distributor for high output flows comprises a first distribution circuit (26) which includes passages of variable cross-section, such as (60a, 61a) or (60b, 61b), in parallel, and two working pressure outlets (37, 39) connected to the two chambers of the assistance cylinder (45), and a second circuit (26A) for operation at high pressures, independent of the pressure outlets.

3 Claims, 5 Drawing Figures

U.S. Patent    Sep. 11, 1984    4,470,432
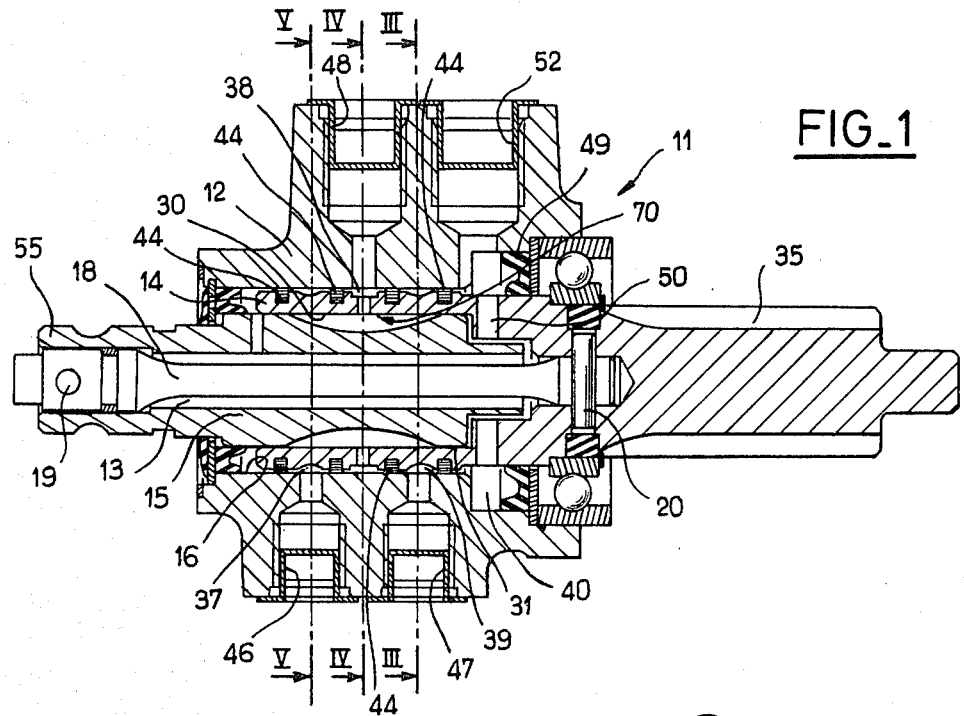
FIG_1
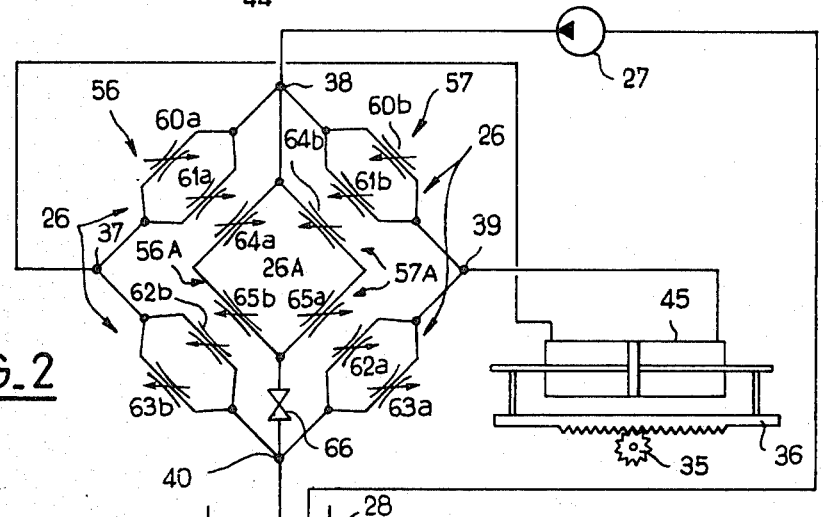
FIG_2
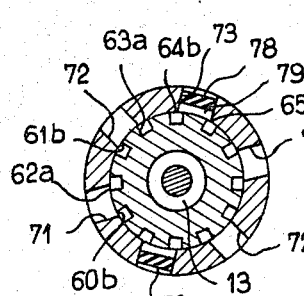
FIG_3
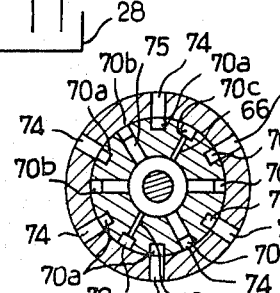
FIG_4
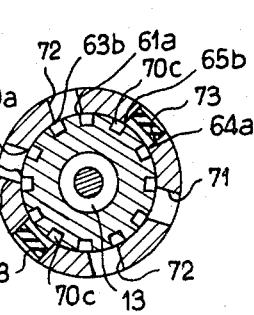
FIG_5

DISTRIBUTOR FOR A HYDRAULIC SERVO MECHANISM

The invention concerns a rotary distributor for a hydraulic servo mechanism, in particular for the servo steering system of a motor vehicle, adapted for those systems known as "centrally open systems" which require a relatively high fluid output, the proposed distribution arrangement lending itself to a particularly simple and rational industrialized application.

A distributor of a simple industrialized type is known, which comprises two distributor elements, inner and outer respectively, provided with coaxial cylindrical portions capable of limited relative rotation about their common axis. In the conventional manner, the inner distributor element is rotatably mounted in an axial bore in the outer distributor element, and the latter is in turn rotatably mounted in a stationary casing. The distribution circuit defined by these two elements consists essentially of for instance six longitudinal grooves arranged on the outer surface of the inner distributor element and of three diametrical blind holes arranged in the outer distributor element. Such a distributor is described in European Patent Application No. EP 0 053 559 filed in the name of the Applicant company. It is entirely satisfactory for low or medium flows, that is to say when forming part of the assisted steering system of a low-powered car. However, if higher outputs are desired with a view to providing greater assistance forces, without thereby increasing the level of pressure losses when the distributor elements are in their rest position corresponding to running in straight lines, the diameter of the bores forming the passages of variable cross-section cannot be increased beyond certain limits because this would be manifested as a impression of a soft elastic play in the steering column, which corresponds to a large angle of rotation of the torsion bar linking the two distributor elements before any change in direction of the wheels takes place. It becomes necessary, then, to multiply the number of grooves and bores in the inner and outer distributor elements, respectively, to obtain a greater number of passages of variable cross-section arranged in parallel.

The invention concerns a novel type of distributor, more particularly in high outout, whose distribution scheme lends itself particularly well to rapid and low cost industrialised application.

More precisely, the invention therefore concerns a distributor for a hydraulic servo mechanism, more particularly for assisted steering, of the type comprising a stationary casing housing two coaxial cylindrical distributor elements capable of a limited relative rotation about their common axis, to and fro about a relative neutral position, these distributor elements, respectively an inner and an outer elements being provided with openings and cavities defining a first fluid circulation circuit, intended to be connected between a fluid source and a fluid reservoir on the one hand and provided with two working pressure outlets on the other hand, this circuit including two distribution branches arranged in parallel between means for connection to said source and means for connection to said reservoir, the branches including passages of variable cross-section of two types distinguished by their opposite directions of variation of cross-section for either direction of said relative rotation of said distributor elements away from said relative neutral position, each branch comprising a series arrangement of passages of said two types including two groups in parallel of passages of the same type having different flow cross-sections at least over a range of relative rotation between the two distributor elements about said relative neutral position, the junction of the two groups in parallel communicating with an aforementioned working pressure outlet of the branch under consideration, characterised in that it comprises a second fluid circulation circuit, similar to said first circuit but independent of said working pressure outlets, arranged between said means for connection to said said fluid source on the one hand, and said means for connection to said reservoir via a calibrated flow restriction on the other hand, the passages of variable cross-section of this second circuit having flow cross-sections greater than those of any of the passages of the same type in said first circuit within the aforementioned range of relative rotation.

The invention will be better understood and its other advantages will appear more clearly in the light of the description which follows of an embodiment of the distributor in accordance with the invention, given only by way of an example, and with reference to the accompanying drawing in which:

FIG. 1 shows a general sectional view of a distributor according to the invention;

FIG. 2 is a diagram showing the fluid circulation circuit defined in this distributor, in conjunction with other elements of the assisted steering system;

FIG. 3 is a section on III—III in FIG. 1 showing only the two distributor elements;

FIG. 4 is a section of IV—IV in FIG. 1 showing only the two distributor elements; and FIG. 5 is a section on V—V in FIG. 1 showing only the two distributor elements.

Referring to FIGS. 1 and 2, the distributor device 11 according to the invention comprises essentially a stationary casing 12, provided with a bore 16 which houses two cylindrical coaxial distributor elements 14 and 15, each provided with a portion in the form of a sleeve. In a conventional manner, the innermost distributor element 15 is rotationally mounted in the sleeve formed by the outermost distributor element 14, whereas the internal space 13 of the sleeve formed by the innermost distributor element 15 houses a torsion bar 18 which is connected, at one of its ends, to the distributor element 15 by a pin 19, and at its other end, to the distributor element 14 by a pin 20. This torsion bar thus constitutes, in a well-known manner, a means for returning the distributor elements to a relative neutral position, and permits a limited rotation of a few degrees of one distributor element with respect to the other about their common axis (coinciding with that of the torsion bar 18) to and fro about said relative neutral position. Moreover, the distributor elements are also provided with openings and cavities, whose arrangement will be described in greater detail with reference to FIGS. 2 to 5, which define a first fluid circulation circuit 26 and a second fluid circulation circuit 26A (see FIG. 2) between a fluid source such as a pump 27 and a fluid reservoir 28. It will be noted, at this stage of the description, that the afore-mentioned openings and cavities interact to form passages of variable cross-section, operating by relative overlapping of the cylindrical contact surfaces 30, 31 of the distributor elements 14 and 15, respectively, during the afore-mentioned limited relative rotation. As the distributor 11 is designed more particularly for an assisted steering system, the outer sleeve forming the distributor element 14 is extended into an output pinion 35 intended to be meshed with a rack 36 (see FIG. 2) of a steering mechanism for the wheels. This distributor element 14, also known as a stator, is rotationally mounted in the housing bore 16, and longitudinally adjacent annular spaces 37, 38, 39, 40 are separately formed between the outer surface of the distributor element 14 and the inner surface of the bore 16 by means of annular seals 44 and 49, so as to form portions of the first fluid circulation circuit 26 and particularly two working pressure outlets communicating with the annular spaces 37 and 39 and intended to be respectively connected to the two chambers of a double-acting cylinder 45 (FIG. 2) whose piston rod is linked to the rack 36. The annular spaces 37 and 39 communicate respectively with the cylinder 45 via connection ports 46 and 47 in the casing 12. In a similar manner, the annular space 38 is connected to the outlet of the pump 27 via a connection port 48 in the casing 12, said assembly constituting the above-mentioned means for connection to the fluid source. The annular space 40 (bounded at one end by the seal 49) communicates with the connection port 52 which constitutes the return outlet to the reservoir 28. Radial holes 50 formed in the outer distributor element 14 enable the space 40 to communicate with the internal space 13 in the inner distributor element 15, in which the torsion bar 18 is housed. The inner distributor element 15 is also known as a rotor and is intended to be connected at its axial end 55 to the steering column (not shown) of the vehicle.

The fluid circulation circuits 26 and 26A will be now described with reference to FIG. 2. In a known manner, the first circuit 26 comprises essentially two parallel branches 56, 57 provided with the afore-mentioned passages of variable cross-section. There are two types of passages distinguished by their opposite directions of variation of cross-section for either direction of said relative rotation between the distributor elements away from the afore-mentioned relative neutral position of the two distributor elements 14 and 15. In this neutral position the torsion bar 18 is relieved of any rotational stress. In the following description, passages of one type or the other will be distinguished by numerical references carrying the suffix "a" or "b", respectively. Thus, at least two passages 60a, 61a may be distinguished in the branch 56, which are arranged in parallel between the annular space 38 for fluid supply and the pressure outlet 37, and at least another two passages 62a, 63a in the branch 57 which are arranged in parallel between the pressure outlet 39 and the annular space 40 for return to the reservoir (see FIG. 2). In a similar way, at least two passages 60b, 61b may be distinguished in the branch 57 which are arranged in parallel between the annular space 38 and the pressure outlet 39, as also at least two passages 62b, 63b in the branch 56 which are arranged in parallel between the pressure outlet 37 and the annular space 40. Thus each branch 56 or 57 includes passages of variable cross-section of the two types (suffix "a" and "b") arranged in series between the fluid source (the pump 27) and the reservoir 28 and a portion of the circuit between passages of different types communicates with the pressure outlets 37, 39 of the branches 56, 57 respectively, these pressure outlets being intended for connection to the two chambers, respectively, of the assistance cylinder 45.

According to an important feature of the invention, the second circuit 26A is similar to the first circuit 26, that is to say it consists of two branches 56A and 57A arranged in parallel and each branch includes an arrangement in series of at least one passage of variable cross-section type "a" and one passage of variable cross-section type "b". More precisely, the branch 56A includes a passage 64a communicating with the means for connection to the fluid source (in particular the annular space 38) and connected in series with a passage 65b, whereas the branch 57A includes a passage 64b communicating with the connecting means 38 and connected in series with a passage 65a. However, the cicuit 26A is independent of the working pressure outlets 37 and 39, that is to say the common point of the passages 64a and 65b is not connected to the annular space 37, nor is the common point of the passages 64b and 65a connected to the annular space 39. Moreover, the common point of the passages of variable cross-section 65a and 65b communicates with the means for connection to the reservoir (in particular the annular space 40) via a calibrated flow restriction 66 known as an "anti-cavitation restriction". The passages 64 and 65 are known as "passages for high pressures" because their complete closure is determined, in a corresponding relative direction of rotation, at an angle of angular displacement between the distributor elements 14 and 15 for which all the other passages of the same type in the first circuit 26 are already closed. For example, the complete closure of the passages 64a, 65a does not occur until after previous closure of passages 60a, 61a, 62a, 63a for a given relative direction of rotation, and during this final range of possible relative rotation between the distributor elements 14 and 15, the fluid flow rate in the circuit 26A is essentially determined by the cross-sections of the passages 64a and 65a on the one hand, and by the cross-section of the flow restriction 66 on the other. It will be noted that in this range of rotation involving relatively high working pressures, the fluid flow in the circuit 26 is effectively nil by reason of the complete closure of passages 60a, 61a on the one hand, and 62a, 63a on the other. The whole fluid flow thus passes through the circuit 26A so that a noticeable pressure drop appears across the restriction 66. This back pressure enables the cavitation threshold in the passages 64a and 65a to be raised, and hence to have the threshold of noisy operation of the distributor also raised, this threshold depending advantageously on the value of the back pressure. Thus, a back pressure of a few bars is sufficient to raise the threshold of noisy operation to several dozens of bars upstream of the restriction 66. In this way the operational noise is eliminated over the whole range of relative rotation of the distributor elements, that is to say over the whole range of working pressures of the cylinder 45. In the same way, the complete closure of passages 64b and 65b does not occur until "after" that of passages 60b, 61b, 62b, 63b and it will be understood that all that which has been described above in reference to passages 64a and 65a and to the restriction 66 also applies for the passages 64b and 65a together with the same restriction 66.

FIGS. 3 to 5 show how the different passages and restrictions constituting the fluid circulation circuits 26 and 26A are practically formed.

In the illustrated embodiment, the distributor element 15 forming the rotor has twelve longitudinal grooves 70 sunk into its outer cylindrical surface 31, which are closed at their axial ends. These grooves are evenly spaced angularly at 30° to one another. Six grooves 70a, e.g. fluid supply grooves, are permanently positioned facing radial holes 74 formed in the distributor element 14, which communicate outwardly with the annular space 38 connected to the pump 27. Six other grooves 70b or 70c are fluid drain grooves positioned so as to alternate with the grooves 70a. The grooves 70b, four in number, are provided innerly with inwardly extending holes 75 of a diameter large enough so as not to create a significant loss of pressure, which establish communication with the internal space 13 housing the torsion bar 18, that is to say with the reservoir 28 via the drain holes 40 and the connection port 52. The grooves 70c, two in number, are each also connected to the internal space 13, but via the afore-mentioned calibrated flow restriction 66. It will be clear at this stage of the description that the number of passages of variable cross-section and of flow restrictions in the embodiment of FIGS. 1, 3, 4 and 5 is doubled relative to that shown in the basic diagram of FIG. 2.

The distributor element 14, e.g. stator, itself is only provided with holes 71, 72, 73 which define all the afore-mentioned passages of variable cross-section which operate by partial overlapping of said grooves in the rotor and said holes in the stator.

Said feature is advantageous in that it allows the elimination of electro-erosion operations to form the openings through the outer distributor element 14.

It is possible nevertheless to adapt the characteristic "Pressure versus Angle of relative rotation" of the distributor to any desired law of variation due to the fact that passages of the same type are arranged in parallel in the same branch 56 or 57 of the first circuit 26 and in the corresponding branch 56A or 57A of the second circuit 26A with different flow cross-sections at least for a range of relative rotation between the two distributor elements about the relative neutral position. A desired law of variation is thus obtained between the increase in pressure available at one of the pressure outlets and the angle of relative rotation in the corresponding direction, by the judicious choice of a combination of different openings and flow cross-sections, these different flow cross-sections being considered, for example, at the relative neutral position of the distributor elements. In the embodiment described, the differences in the flow cross-section between the passages 60, 61, 64, (or 62, 63, 65) are simply obtained by forming the corresponding holes 71, 72 and 73 with different diameters. Thus, certain passages of different types in a same branch (60a, 62b) or (61a, 63b) or (64a, 65b) are arranged in pairs, and a pair is defined by the interaction of a hole in the stator 14 (71 or 72 or 73 respectively) with two adjacent grooves (70a, 70b) or (70a, 70c) communicating with the pump 27 and the reservoir 28, respectively, said holes being equidistant from the two adjacent grooves when in the relative neutral position illustrated in FIGS. 3 to 5. Then, with such an arrangement, it may be seen that a simple difference in diameter between the holes 71, 72 and 73 determines completely the flow cross-sections of the passages of variable cross-section relative to one another. In the example illustrated, the holes 72 have a larger diameter than that of the holes 71 whereas the diameter of the holes 73 is larger than that of the holes 72 so that the passages of variable cross-section in the second circuit 26A (which is formed by the interaction of the holes 73, the grooves 70a and the grooves 70c) have flow cross-sections greater than those of any passage of the same type in the first circuit 26 within the aforementioned range of relative rotation. In other words, for a large relative rotation between the distributor elements, corresponding to an operation involving high fluid pressures, the working pressure will only be determined by the flow cross-sections of the different passages of variable cross-section in the second circuit 26A and of the calibrated restrictions 66. Two groups of holes 71 to 73 may be distinguished, positioned facing the annular passages 37 and 39 respectively, that is to say the working pressure outlets in FIG. 2. These two groups of holes are visible in FIGS. 5 and 3, respectively, and form, by interaction with the grooves, all the passages of variable cross-section in the branches 56, 56A on the one hand and 57, 57A on the other. The holes 73 are plugged for part of the wall thickness of the distributor element 14, by metal inserts 78, so as to form corresponding internal blind recesses 79 which interact with the grooves 70a and 70c. These plugs render the circuit 26A independent of the working pressure outlets 37 and 39.

The operation of the distributor is as follows. Supposing that the driver turns the rotor 15 in a clockwise direction, all the passages bearing the suffix "a" will close, and all the passages bearing the suffix "b" will open. As the diameter of the holes 71 is greater than that of the holes 72, it is the passages 60a in the branch 56, and 62a in the branch 57, which will first close completely. Then, for an additional relative rotation of the two distributor elements in the same direction, the end result will be the complete closure of passages 61a and 63a. During this entire course of relative rotation, the increase in pressure at the pressure outlet 39 develops according to a predetermined curve as a function of the angle of relative rotation (in practice a substantially parabolic curve), this curve resulting from the choice of the diameters of the holes 71, 72 and 73. For an additional relative rotation in the same direction, all fluid circulation in the circuit 26 is effectively interrupted (the fluid which is circulating corresponds only to the quantity necessary to operate the cylinder 45). Thus the pressure variation is entirely determined by the passages of the circuit 26A, these variations being however passed on up to the working pressure outlet 39 via the annular space 38 and the passages 60b, 61b which are open wide. The entire fluid flow flowing through the passages of variable cross-section in the circuit 26A therefore passes through the two calibrated flow restrictions 66. The back pressure thus created allows the elimination of noise under these conditions of operation at high pressures, corresponding in particular to the parking or garaging manoeuvres of the vehicle equipped with such a system of assisted steering. The operation is altogether similar for the other direction of rotation.

I claim:

1. A distributor for hydraulic servo-mechanism, more particularly for assisted steering, of the type comprising a stationary casing (12) housing two coaxial cylindrical distributor elements capable of a limited relative rotation about their common axis, to and fro about a relative neutral position, these distributor elements, respectively an inner (14) and an outer (15) elements being provided with openings and cavities defining a first fluid circulation circuit (26) intended to be connected between a fluid source (27) and a fluid reservoir (28) on the one hand, and provided with two working pressure outlets (37, 39) on the other hand, this circuit including two distribution branches (56, 57) arranged in parallel between means for connection to said source and means for connection to said reservoir, said branches including passages of variable cross-section of two types ("a", "b") distinguished by their opposite directions of variation of cross-section for either direction of said relative rotation away from said relative neutral position, each branch comprising a series arrangement of passages of said two types including two groups in parallel of passages of the same type having different flow cross-sections at least over a range of relative rotation between said two distributor elements about said relative neutral position, the junction of the two groups in parallel communicating with said working pressure outlet (37, 39) of the branch under consideration, characterized in that it comprises a second fluid circulation circuit (26A), similar to said first circuit but independent of said working pressure outlets, arranged between said means for connection to said fluid source on the one hand, and said means for connection to said reservoir via a calibrated flow restriction (66) on the other hand, the passages of variable cross-section of this second circuit having flow cross-sections greater than those of any of the passages of the same type in said first circuit within said range of relative rotation.

2. A distributor for a servo-mechanism according to claim 1, including an inner distributor element provided in its outer cylindrical surface with longitudinal grooves (70) evenly spaced and alternately connected to said means for connection (38) to said fluid source and to said means for connection (40) to said reservoir, and wherein two passages of variable cross-section of different types in the same branch of said first circuit are determined by partial overlapping of two adjacent said longitudinal grooves (70a, 70b) and of a transversing hole (71 or 72) formed radially in said outer distributor element in facing relationship with an annular space arranged between said outer distributor element (14) and said casing (12) to define the corresponding working pressure outlet (37 or 39), characterized in that the passages of variable cross-section of different types in the same branch on said second circuit (26A) are determined by the partial overlapping of two adjacent said longitudinal grooves (70a, 70c) and of a hole (73) formed in the surface of the outer distributor element and plugged for part of its wall thickness to provide an internal recess (79) which interacts with said two grooves, one of said last mentioned two grooves (70c) being connected to said reservoir and in communication with said calibrated flow restriction (66).

3. A distributor according to claim 2, of the type in which the grooves (70b, 70c) intended to be connected to said reservoir communicate, via holes arranged respectively in the bottom of the latter, with an axial cavity (13) in said inner distributor element (15) forming part of said means for connection to said reservoir, characterized in that said holes arranged in the bottom of such grooves (70c) belonging to said second circuit (26A) constitute said calibrated flow restriction.

* * * * *